United States Patent
Zander et al.

(10) Patent No.: US 11,522,598 B2
(45) Date of Patent: Dec. 6, 2022

(54) METHOD FOR INTERFERENCE REDUCTION IN A COMMUNICATION DEVICE

(71) Applicant: SONY CORPORATION, Tokyo (JP)

(72) Inventors: Olof Zander, Södra Sandby (SE); Torgny Palenius, Barsebäck (SE); Fredrik Rusek, Eslöv (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/273,379

(22) PCT Filed: Jul. 31, 2019

(86) PCT No.: PCT/SE2019/050718
§ 371 (c)(1),
(2) Date: Mar. 4, 2021

(87) PCT Pub. No.: WO2020/067945
PCT Pub. Date: Apr. 2, 2020

(65) Prior Publication Data
US 2021/0297140 A1    Sep. 23, 2021

(30) Foreign Application Priority Data
Sep. 24, 2018 (SE) .................... 1851135-2

(51) Int. Cl.
*H04B 7/08* (2006.01)
*H04B 7/06* (2006.01)

(52) U.S. Cl.
CPC ........... *H04B 7/088* (2013.01); *H04B 7/0695* (2013.01)

(58) Field of Classification Search
CPC ........................ H04B 7/088; H04B 7/0695
See application file for complete search history.

(56) References Cited

U.S. PATENT DOCUMENTS 9,980,270 B2 * 5/2018 Stirling-Gallacher ...................... H04W 72/082
2013/0286960 A1 10/2013 Li
(Continued)

FOREIGN PATENT DOCUMENTS

EP     3280068 A1    2/2018
JP     2018061128 A  4/2018
(Continued)

OTHER PUBLICATIONS

International Search Report and Written Opinion from corresponding International Application No. PCT/SE2019/050718, dated Sep. 23, 2019, 10 pages.
(Continued)

*Primary Examiner* — Kenneth T Lam
(74) *Attorney, Agent, or Firm* — Tucker Ellis LLP

(57) ABSTRACT

A method in a communication device (30) for transmitting a beam report (823) to an access node (20) of a wireless network (1), the method comprising transmitting (810,817) a capability indication (820) to the wireless network to announce capability to perform interference reduction between received beams; receiving (812) a first beam (50) and a second beam (51) of an access node beam sweep (802); determining (814) first link quality metric for the received beams; determining (815) second link quality metric for the received beams based on applied interference reduction in the communication device; transmitting (817) a beam report (823) based on at least one of first and second link quality metric.

20 Claims, 6 Drawing Sheets

(56) References Cited

U.S. PATENT DOCUMENTS

| | | | |
|---|---|---|---|
| 2014/0135028 A1* | 5/2014 | Wang | H04W 72/1231 |
| | | | 455/452.2 |
| 2015/0009964 A1* | 1/2015 | Ellenbeck | H04W 72/082 |
| | | | 370/336 |
| 2016/0135194 A1* | 5/2016 | Kim | H04L 5/0048 |
| | | | 370/329 |
| 2016/0270087 A1* | 9/2016 | Soriaga | H04B 7/0671 |
| 2016/0337056 A1* | 11/2016 | Frenne | H04W 24/10 |
| 2016/0352012 A1* | 12/2016 | Foo | H04L 25/03343 |
| 2016/0353424 A1* | 12/2016 | Stirling-Gallacher | |
| | | | H04B 7/0626 |
| 2018/0199233 A1* | 7/2018 | Nammi | H04L 5/00 |
| 2019/0261349 A1* | 8/2019 | Ren | H04B 7/0452 |
| 2020/0028599 A1* | 1/2020 | Zhang | H04B 7/024 |
| 2020/0067615 A1* | 2/2020 | Ghanbarinejad | H04B 17/309 |
| 2021/0167821 A1* | 6/2021 | Chen | H04B 7/0408 |

FOREIGN PATENT DOCUMENTS

| | | |
|---|---|---|
| WO | 2014076636 A1 | 5/2014 |
| WO | 2017218794 A1 | 12/2017 |

OTHER PUBLICATIONS

Swedish Search Report from corresponding Swedish Application No. 1851135-2, dated Feb. 26, 2019, 3 pages.

\* cited by examiner

METHOD FOR INTERFERENCE REDUCTION IN A COMMUNICATION DEVICE

TECHNICAL FIELD

The present invention relates to methods for operating a wireless communication system, in particular to methods for reducing interference. Specifically, the invention relates to operating a wireless communication system according to multiple input and multiple output (MIMO) technologies, wherein a communication device is capable of interference reduction. The present invention relates furthermore to an access node and a wireless communication system supporting the methods.

BACKGROUND

Increasing use of mobile voice and data communications may require a more efficient utilization of the available radio frequency resources. For increasing data transmission performance and reliability, the so-called multiple input and multiple output (MIMO) technology may be used in wireless radio telecommunication systems for transmitting information between the devices, for example between a base station, also referred to herein as an access node, and a user equipment, also referred to herein as a communication device. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal, spectral, as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit data signals, so-called streams, from each of the multiple transmit antennas or a combination thereof. Therefore, the spatial dimension is reused or multiplexed more than one time. These streams may further be independent and separately encoded.

The so-called full dimensional MIMO (FDMIMO) refers to a technology that arranges the signals transmitted to antennas in the form of beams that are able to power multiple receivers in three dimensions. For example, a base station may comprise a large number of active antenna elements in a two-dimensional grid and the use of the FDMIMO technology enables a support of many spatially separated users on the same time/frequency resource blocks simultaneously. This may reduce interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic may need information about radio channel properties between the user equipment and the antennas of the base station. Vice versa, in order to adapt the transmit signal at each individual antenna of the user equipment, a user equipment logic may need information about the radio channel properties between the base station and the antennas of the user equipment. For this purpose, a so-called channel sounding may be performed to determine the radio channel properties between the user equipment and the base station. The channel sounding may comprise transmitting predefined pilot signals which may allow the base station and the user equipment to set their configuration antenna parameters for transmitting signals so as to focus radio energy or for receiving radio signals from a certain direction.

In evolving standards, for example in 3GPP RAN1 Release 15, it is defined that the base station broadcasts beam shaped synchronization signals (so-called SS-bursts). Different SS-bursts targeting different directions or polarizations are distributed both in time and frequency domain such that each beam is occurring at each sub-band over time. The user equipment may listen for the SS-bursts and may use the received signal to calibrate frequency and timing. The user equipment may scan or adjust its receive beam in order to find the direction that is associated with the strongest SS-burst. The base station may repeatedly perform beam sweeps in dedicated resources. Each transmitted beam comprises a CSI-RS (pilot), synchronization information, and a beam identifier (beam ID).

The aggregated congestion of all connected user equipment, particularly in urban areas, is problematic. The solution in MIMO of dividing the cells in smaller sectors, has the potential to increase the resolution of the base station and enables it to separate users in the spatial domain by the use of beamforming. In principle, the cell is divided into virtual sub-cells where different user equipment can be served simultaneously using the same time/frequency resources.

A problem associated with the concept of beamforming is leakage between the different beams transmitted from the base station. Specifically, at lower frequencies when the size of each antenna element, in both the user equipment and the base station, is big, the antennas in the user equipment have limited capability to direct the power toward the base station, and the beam width from the base station also gets wider due to limited physical size of the antennas. Also, at least at certain frequencies, a user equipment may cause and/or be exposed to interference from neighboring beams, for example at the boundary between two beams. FIGS. 2 and 3 schematically illustrate problems that may occur, where base station beams 50, 51 are indicated, and where a device beam 36 defined in the user equipment 30 for reception of base station beams, is drawn with double lines. FIG. 2 illustrates one such problematic scenario, where the user equipment 30 is located at the boundary between two base station beams 50, 51, and where the user equipment beam-forms a device beam 36 toward the base station, such as in a mm-wave scenario. FIG. 3 illustrates another scenario, where a reflection off an object or surface 3 of a neighbor beam 51 interfere a user equipment 30, which may have a less directive antenna pattern (lower frequency), wherein the user equipment is otherwise capable of detecting a beam 50 from the base station terminal in the device beam 36.

In view of the above, there is a need in the art for methods and devices which address at least some of the above shortcomings of conventional MIMO systems. In particular, there is a need in the art for improving operation of communication devices and base stations in a wireless communication system to alleviate problems related to interference among different base station beams in communication between a base station and a user equipment.

SUMMARY

According to the present invention, this object of overcoming these and other problems is achieved by the combined features of the independent claims. The dependent claims define embodiments of the invention.

According to a first aspect, a method is provided for use in a communication device for transmitting a beam report to an access node of a wireless network, the method comprising transmitting a capability indication to the wireless network to announce capability to perform interference reduction between received beams;

receiving a first beam and a second beam of an access node beam sweep;

determining a link quality metric for the received beams based on interference reduction applied to favor reception of the first beam over the second beam in the communication device;

transmitting a beam report based on at least said link quality metric.

In one embodiment, the method comprises receiving a request signal from the access node to report interference reduction of received beams in the communication device, wherein the beam report is transmitted based on said link quality metric responsive to receiving said request signal.

In one embodiment, the communication device comprises an antenna array configured for beamforming, wherein said capability indication includes an indication of a number of angular directions which the communication device is capable of resolving for beam.

In one embodiment, the method comprises receiving a control signal from the access node indicating a beam selection for communication, and an instruction to apply interference reduction in the communication device.

In one embodiment, the method comprises determining a measure of possible attenuation of at least one of said first and second beam based on said applied interference reduction, wherein said beam report indicates said measure.

In one embodiment, the communication device comprises an antenna array configured for beamforming, wherein the interference reduction is carried out by means of changing code book entry for said antenna array.

In one embodiment, the communication device comprises an antenna array configured for beamforming, wherein the interference reduction is carried out by tuning a beam angle for said antenna array.

In one embodiment, the communication device comprises an antenna array configured for beamforming, wherein the interference reduction is carried out by applying zero forcing.

In one embodiment, said link quality metric related to favoring the first access node beam is primary link quality metric, the method further comprising determining secondary link quality metric for the received beams based on interference reduction applied to favor reception of the second beam over the first beam in the communication device;

wherein said beam report includes said primary and said secondary link quality metrics.

According to a second aspect, a method is provided for use in an access node of a wireless network, for transmission of radio signals in a plurality of beams of a beam sweep, comprising transmitting a first beam and a second beam;

detecting capability of a communication device to perform interference reduction;

transmitting a request signal to the communication device to report interference reduction of received beams in the communication device;

receiving a beam report from the communication device including link quality metric for the first and second beams based on applied interference reduction in the communication device.

In one embodiment, the method comprises selecting at least one beam for communication with the communication device based on at least said beam report;

transmitting a control signal to the communication device, indicating beam selection and an instruction to apply interference reduction in the communication device.

According to a third aspect, a communication device is provided, configured to communicate with an access node of a wireless network, comprising an antenna arrangement configured for beamforming, for receiving radio signals transmitted in a plurality of beams from an access node, and for transmitting radio signals; and a logic coupled to the antenna arrangement and configured to:

transmit a capability indication to the wireless network to announce capability to perform interference reduction between received beams;

receive a first beam and a second beam of an access node beam sweep;

determine a link quality metric for the received beams based on interference reduction applied to favor reception of the first beam over the second beam in the communication device;

transmit a beam report based on at least said link quality metric.

In one embodiment, the logic is configured to receive a request signal from the access node to report interference reduction of received beams in the communication device; and include the second link quality metric in the beam report based on receiving said request signal.

In one embodiment, said capability indication includes an indication of a number of angular directions which the communication device is capable of resolving for beam reception.

In one embodiment, the logic is configured to receive a control signal from the access node indicating a beam selection for communication; and apply interference reduction in the communication device based on information in said control signal.

According to a fourth aspect, an access node of a wireless network is provided, comprising an antenna arrangement configured for beamforming, for transmission of radio signals in a plurality of beams of a beam sweep, and for receiving radio signals from a communication device; and a logic coupled to the antenna arrangement and configured to:

transmit a first beam and a second beam;

detect capability of the communication device to perform interference reduction;

transmit a request signal to the communication device to report interference reduction of received beams in the communication device;

receive a beam report from the communication device including link quality metric for the first and second beams based on applied interference reduction in the communication device.

In one embodiment, the logic is configured to select at least one beam for communication with the communication device based on at least said beam report;

transmit a control signal to the communication device, indicating beam selection and an instruction to apply interference reduction in the communication device.

According to a fifth aspect, a method is provided for a communication device for transmitting a beam report to an access node of a wireless network, the method comprising transmitting a capability indication to the wireless network to announce capability to perform interference reduction between received beams;

receiving a first beam and a second beam of an access node beam sweep;

determining first link quality metric for the received beams;

determining second link quality metric for the received beams based on applied interference reduction in the communication device;

transmitting a beam report based on at least one of first and second link quality metric.

Although specific features are described in the above summary and in the following detailed description described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Figure 1:
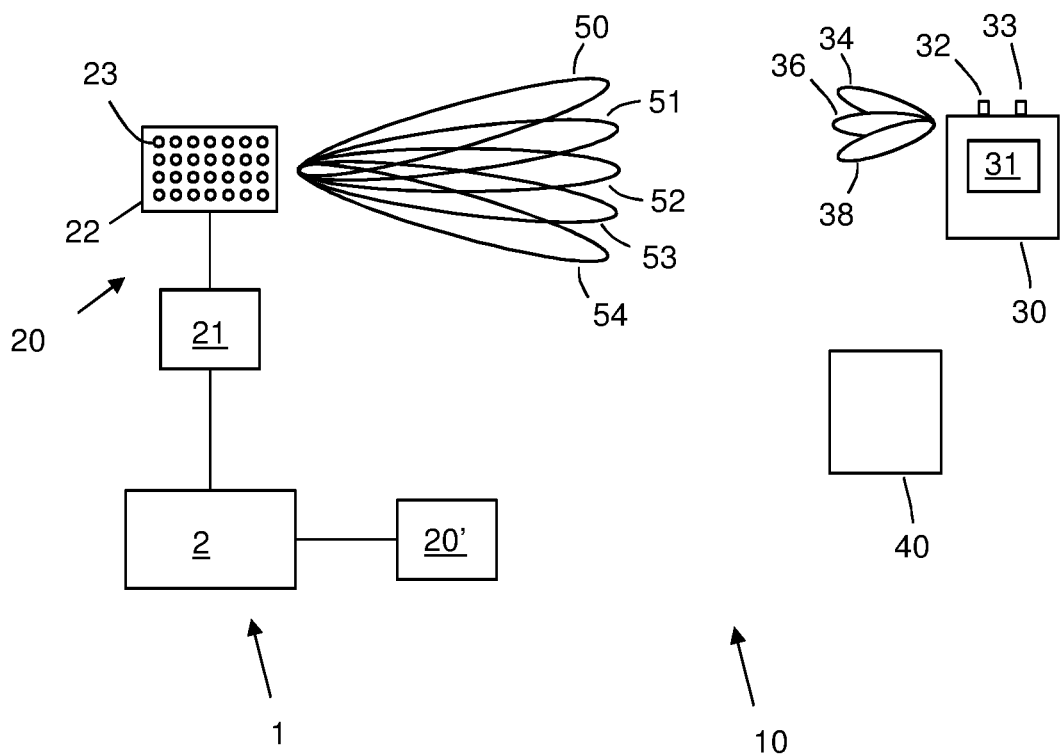
FIG. 1 schematically illustrates a wireless communication system according to an embodiment.

With reference to FIG. 1, solutions are described in the context of wireless communication in a wireless communication system 10, typically operating by means of radio communication or other electromagnetic communication. As such, the wireless communication system 10 includes at least one wireless communication device 30, 40, configured to communicate with a wireless network 1 via an access node 20. The network 1 may include a core network 2 and a plurality of access nodes 20, 20' connected to the core network 2. In various embodiments the wireless system 10 may include a cellular wireless network, where a plurality of access nodes 20, 20' may cover a contiguous area and be configured to hand over communication or connection from one access node to another, as a wireless communication device 30 moves from one cell to another. In such systems, access nodes are commonly referred to as base stations. In 3GPP systems for LTE the term eNB is used, and for 5G New Radio (NR) the term gNB has been employed. Alternatively, the access nodes 20 may form discontinuous or uncorrelated coverage, and e.g. act as Wi-Fi access points or hotspots under one or more 3GPP 802.11 specification.

Herein, the term access node will generally be used to designate an entity of a wireless network, used for establishing and controlling an air interface for communication with wireless communication devices. Furthermore, communication device will be the term used for a wireless device configured to communication with an access node, and possibly directly with or via other communication devices. In specifications under 3GPP, such communication devices are generally referred to as user equipment, UE.

FIG. 1 shows a wireless communication system 10 according to an embodiment. The wireless communication system 10 includes at least one access node 20 and a plurality of communication devices. In FIG. 1, two communication devices 30 and 40 are shown. The access node 20 may support a so-called multiple input and multiple output (MIMO) technology and therefore the access node 20 may have a large number of antennas, for example several tens or in excess of one hundred antennas.

The access node 20 comprises an antenna arrangement 22 comprising a plurality of antennas which are indicated by circles in FIG. 1. One exemplary antenna of the plurality of antennas is referenced by reference sign 23. The antennas 23 may be arranged in a two-dimensional or three-dimensional antenna array on a carrier. The access node 20 may comprise furthermore associated (not shown) transceivers for the antennas 23. The access node 20 comprises furthermore an access node logic 21. The access node logic 21 is coupled to the antenna arrangement 22 and comprises for example a controller, a computer or a microprocessor. The logic 21 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 21 over a data bus. The data storage device is considered a non-transitory computer readable medium. One or more processors of the logic 21 may execute instructions stored in the data storage device or a separate memory in order to carry out operation of the access node 20, as outlined herein. The access node 20 may comprise more components, for example a power supply, but these components are not shown in FIG. 1 for clarity reasons. Although in FIG. 1 only one antenna arrangement 22 is shown, the access node 20 may comprise more than one antenna arrangement, for example two, three, four or even more, for example several tens of antenna arrangements, which may cooperate with each other and which may be arranged near to each other or spaced apart.

The antenna arrangement 22 may be configured to transmit radio-frequency signals, or radio signals for short, into specific directions, herein referred to as beams. Five of these beams are shown in FIG. 1 and indicated by reference signs 50-54. The configuration of the beams may be static or dynamic. The transmission of radio frequency signals into a specific direction may be achieved by beamforming technologies as it is known in MIMO technologies. In connected mode, a communication device 30 may be able to communicate with the access node 20 through one beam, or possibly more than one beam. However, the access node 20 may continuously announce its beams by beam sweeping, wherein the beams are individually announced in different resources, such as one at a time, where after communication devices are provided with the opportunity to report back to the access node 20, indicating one or more detected beams. This may be referred to as beam sweeping.

The antenna arrangement 22 may be equipped with dual polarized antennas and may therefore have the capability to transmit and/or receive signals of any polarization, for example a first polarization and second polarization, wherein the first and second polarizations are orthogonal to each other. Furthermore, in particular spatially distributed antenna arrangements may be capable of transmitting radio-frequency signals having also a third polarization which is orthogonal to the first polarization and orthogonal to the second polarization.

In the communication system 10, as shown in FIG. 1, a plurality of communication devices like mobile phones, mobile and stationary computers, tablet computers, smart wearable devices or smart mobile devices may be arranged. Two exemplary communication devices 30 and 40 are shown in FIG. 1. Each of the communication devices 30 and 40 may be configured to communicate with the access node 20.

In the following, the communication device 30 will be described in more detail. However, the communication device 40 may comprise similar features as the communication device 30 and may therefore act similarly. The communication device 30 comprises one or more antennas. In the exemplary embodiment shown in FIG. 1, the communication device 30 comprises two antennas 32 and 33. For example, the antennas 32, 33 may each comprise an antenna panel or an antenna array, or the antennas 32, 33 may be formed by an antenna array comprising a plurality of antennas. Furthermore, the communication device 30 comprises a logic 31. The logic 31 may comprise for example a controller or microprocessor. The logic 31 may also comprise or be connected to a data storage device configured to include a computer readable storage medium. The data storage device may include a memory and may be, for example, one or more of a buffer, a flash memory, a hard drive, a removable media, a volatile memory, a non-volatile memory, a random access memory (RAM), or other suitable device. In a typical arrangement, the data storage device includes a non-volatile memory for long term data storage and a volatile memory that functions as system memory for the control unit. The data storage device may exchange data with a processor of the logic 31 over a data bus. The data storage device is considered a non-transitory computer readable medium. One or more processors of the logic 31 may execute instructions stored in the data storage device or a separate memory in order to carry out operation of the communication device 30, as outlined herein. The communication device 30 may comprise more components, for example a graphical user interface and a battery, but these components are not shown in FIG. 1 for clarity reasons. The antennas 32, 33 of the communication device 30 may be arranged spaced apart from each other, for example the two antennas 32 and 33 may be arranged at a top side of the communication device near the edges. As an alternative, one or more antennas may be arranged at the top side and some other antennas may be arranged at a bottom side of the communication device 30. The two, or more, antennas 32, 33 form an antenna arrangement, whereby the communication device 30 may be configured to receive radio signals in multiple device beams 34, 35, e.g. multiple receive beams and multiple transmit beams, simply referred to herein as device beams 34, 35. For example, one device beam 34 may be configured for reception and/or transmission of radio signals with a first phase shift and a second device beam 35 may be configured for reception and/or transmission of radio signals with a second phase shift. In various embodiments, this may mean that a first beam 34 is configured to receive and/or transmit radio signals in first direction, whereas a second beam is configured to receive and/or transmit radio signals in a second direction. The communication device 30 is thereby configured for communication with spatial directivity. Such directions may be set by the antenna structure, or by phase adaptation by means of one or more phase shifters connected to the antenna arrangement 32, 33. Since a communication device 30 may be mobile, and thus rotatable with regard to the access node 20, device beam adaptation and/or selection may be repeatedly required.

The solutions provided herein are based on the notion that the access node 20 may benefit from a capability of a communication device 30 to reduce interference detected from various access node beams 50, 51 in receive mode, and possibly also caused to the access node 20 in transmit mode. It can be noted that in TDD systems reciprocity is often assumed why the same technique may apply both during reception and transmission. The concept requires that the communication device 30 is able to detect an interference channel, or direction, of one or more access node beams 50, 51.

In wireless systems operating with MIMO, such as NR as proposed by 3GPP and FD-MIMO of 3GPP-LTE, an access node 20 performs broadcasted beam sweeps. A communication device 30 within range of the access node 20 continuously probes the different access node beams and selects the strongest as candidates. In a MIMO case this may be multiple beams. A beam report is transmitted to the access node 20, which typically includes the candidate list. Final selection of one or more beam pairs is made by the access node 20. In each broadcasted access node beam 50, 51, an access node beam identity is conveyed, which may be detected by the communication device 30. This access node beam identity may take the shape of a pilot signal, such as a channel sounding signal, e.g. CSI-RS, that is exploited by the terminal. In case the communication device 30 has beamforming capability, the access node identity may be used to define a device beam 36 direction, both codebook and pilot defined precoder, for at least reception of a certain access node beam 50. The communication terminal 30 may further use detected access node identities from adjacent beams 51, received in the communication device 30, to estimate their interference properties, such as direction, phase, strength and polarization. In various embodiments, the communication device 30 may further be configured to attenuate signals from one or more of said beams 50, 51, in particular adjacent beams 51 which are received with lower link quality than a more suitable access node beam 50. In various embodiments, this may be obtained by a logic 31, which e.g. may be configured to redesign/modify entries in a codebook from which the device 30 selects its precoder or beam former, which forms an operative part of the communication device 30. In codebook-based precoding, a first codebook entry may be selected based on optimization of received power, by extensive search or some other suitable algorithm. Reselection of codebook may include that the communication device 30 also identifies an alternative codebook entry, e.g. by extensive search or other algorithm, perhaps also from an extended codebook, where the particular interference is suppressed. In this operation, signal-to-interference-plus-noise ratio SINR optimization may be favored, rather than the rx power. An alternative technique for attenuating one or more beams, so as to selectively favor one received access node beam 50, may involve tuning a beam angle of the antenna arrangement 32, 33. The access node beam 50 may be selected based on that it yields the strongest link, based on received DL power. For interference suppression, the communication device 30 may be configured to tune the beam direction of its device beams, so as to improve the SINR. In yet another embodiment, zero forcing (ZF) operation, or null-steering, may be employed. The communication device 30 may select a beam based on signal strength from different DL pilots, and computes the precoder $W1=h^*$, based on the strongest pilot only, e.g. associated with access node beam 50. Then, based on a pilot from at least one of the interfering beams 51, the communication device 30 computes a new precoder that nulls the interfering beams. As the communication device 30 receives pilots from different beams, it may compute a channel matrix, H, where rows are communication device 30 antennas and columns are the incoming BS beams. The ZF precoder may be given by, $W2=H^{\wedge}(H)*(H*H^{\wedge}(H))^{\wedge}(-1)$, or $H'/(H'H)$ with a different notation. Also regularized ZF may be considered for the purpose of attenuation of interfering beams, where noise is also considered, by maximizing the SINR rather than minimizing interference. By employing a suitable technique for interference reduction by means of the logic 31 in connection with the antenna arrangement 32, 33, e.g. according to any of the provided examples, interference reduction may be obtained, with respect to at least reception of access node beams 50, 51, i.e. in downlink (DL), but may also be applied to reduce interference for transmission, i.e. in uplink (UL).

Figure 2:
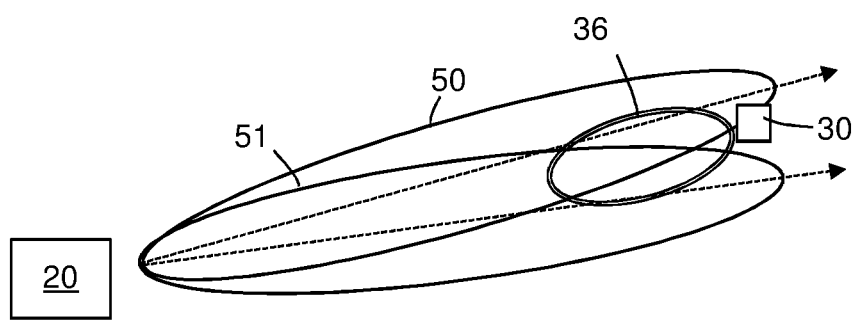
FIG. 2 schematically illustrates transmission of signals in two adjacent different beams of an access node, configured to transmit in multiple beams, and detection in the communication device.
Figure 3:
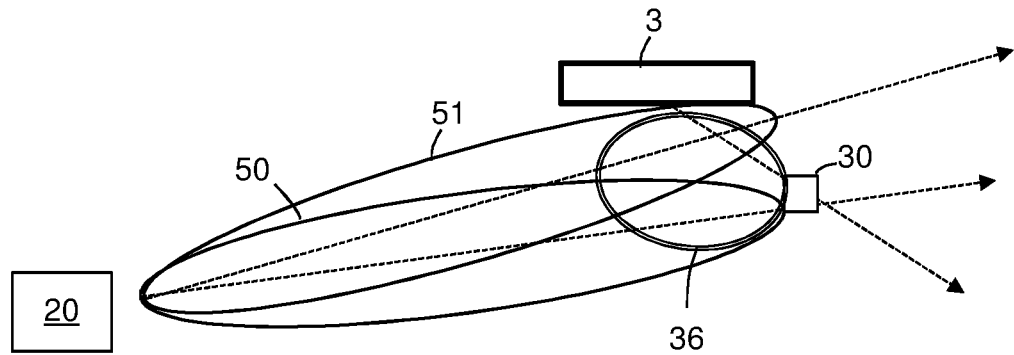
FIG. 3 schematically illustrates transmission of signals in two different beams of an access node, where one beam is reflected such that both beams are received in the communication device.
Figure 4:
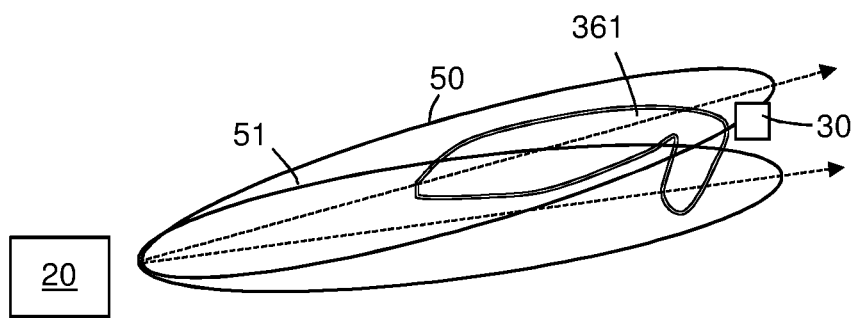
FIG. 4 schematically illustrates transmission of signals in two different beams of an access node, where one beam is reflected such that both beams are received in the communication device.
Figure 5:
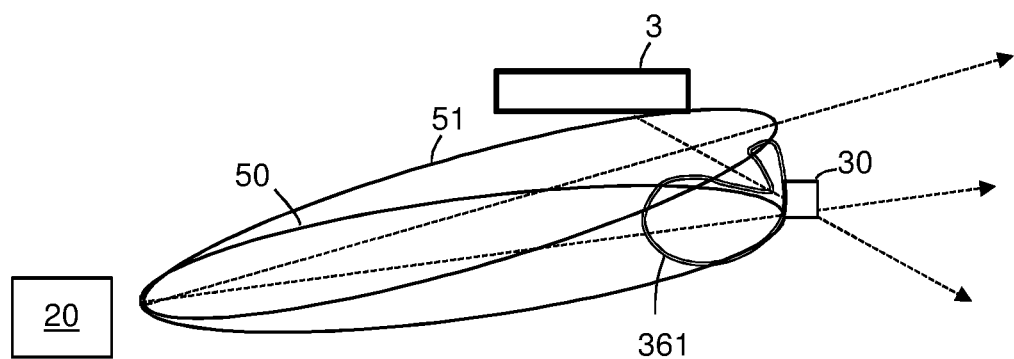
FIG. 5 schematically illustrates transmission of signals in two different beams of an access node, where one beam is reflected such that both beams are received in the communication device.

FIG. 4 schematically illustrates a scenario similar to that of FIG. 2, but with applied interference reduction. In a corresponding manner, FIG. 5 illustrates a scenario similar to that of FIG. 3, but with applied interference reduction. These drawings are highly schematic and drafted to illustrate the object to be obtained by selective interference reduction. The interference reduction may be obtained by adjusting an antenna pattern of the antenna arrangement 32, 33 in the communication device, e.g. by any of the aforementioned techniques. By means of digital beamforming in the communication device, using the antenna arrangement 32, 33, the direction of received access node beams 50, 51 may be calculated e.g. based on detected CSI-RS. Detecting the direction of the access node beams 50, 51 may involve sweeping one or more beams or lobes defined by the antenna arrangement 32, 33. Separate detection of a common access node beam in two or more antenna panels 32, 33 may also be used for determining the direction of a received access node beam. Based on a detected direction of received access node beam, a receive lobe or beam 36 of the communication device 30 may be adapted to advantageously favor reception in one access node beam 50, while suppressing reception of another access node beam 51, to thereby accomplish selective interference reduction, i.e. to favor reception of one access node beam 50 over other access node beam(s) 51. This may e.g. be accomplished by employing any of the above-referenced techniques for interference reduction. In general, this concept works in TDD systems where reciprocity can be assumed. In the FDD case, depending on the frequency offset between UL and DL the angular directions and channel strength may still be similar.

Figures 6, 7A, 7B, 7C:
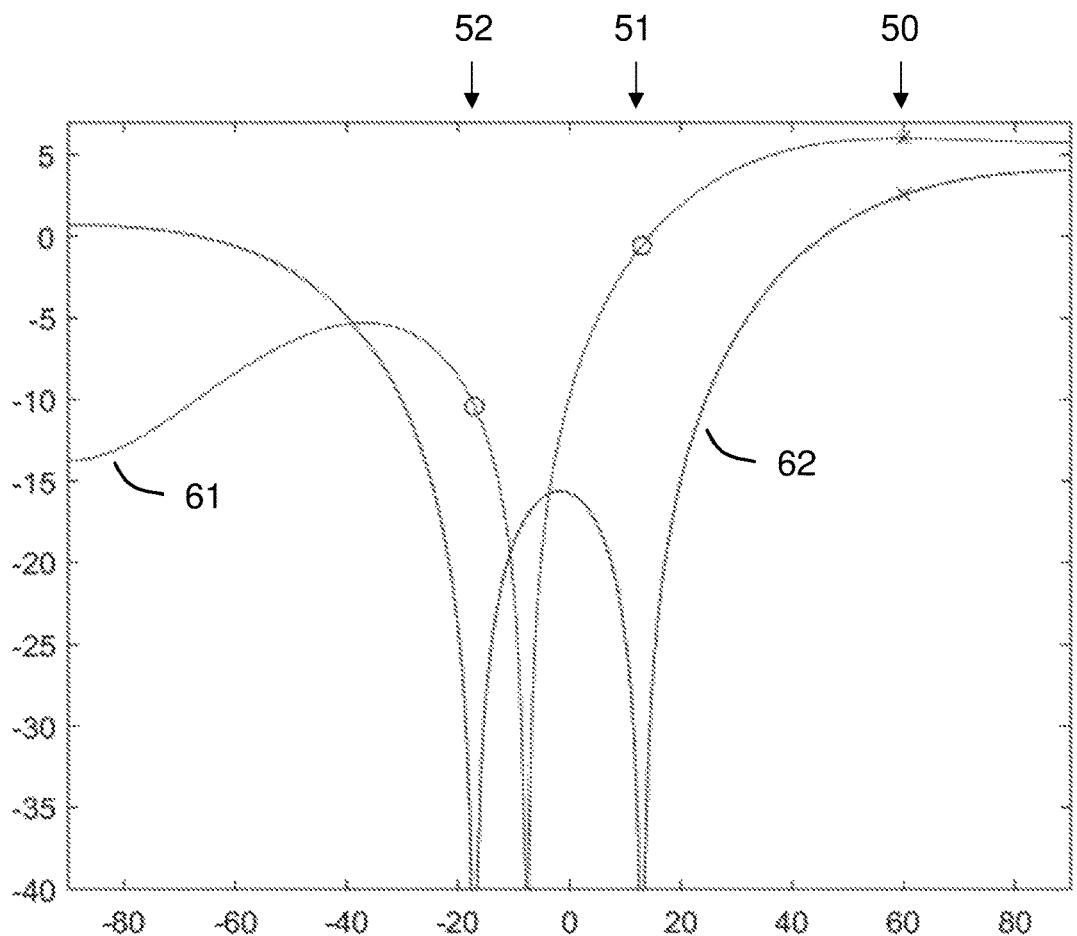
FIG. 6 schematically illustrates a simulation of interference reduction in a communication device according to an embodiment, to favor one beam and selectively attenuate two other beams.
FIGS. 7A to 7C schematically illustrate data included in a beam report according to various embodiments.

FIG. 6 illustrates a simulation based on a four-antenna array 32, 33 in the communication device 30. In this example, a desired beam 50 is at 60 degrees, marked by x, and two interfering beams 51, 52 are at 15 and −17 degrees, respectively, marked by o. The vertical axis represents attenuation, which may correspond to a link quality metric or value for at least reception of radio signals in different access node beam angles. The graph 61 represents a first link quality metric for reception, without manipulation of the antenna arrangement for interference reduction. The second graph 62 represents a second link quality metric for reception, after interference reduction by ZF. As can be seen, the desired beam 50 at 60 degrees drops by about 3 dB in this example, while the interferers 51, 52 are totally canceled. As previously noted, other forms of interference reduction than ZF may be employed in alternative embodiments.

In operation in a wireless communication system 10, a communication device 30 is normally required to report a link quality metric, such as signal strength, gain or channel value, for detected access node beams 50, 51 to the access node 20 in a beam report. The beam report may be referred to as a beam candidate list. The beam report preferably includes an identity of a received access node beam 50 and the detected link quality metric for receiving that beam 50, as determined by the communication device 30. In various embodiments, the communication device may be configured to, or have an option to, report either the link quality metric before or after applied interference reduction, such as the precoding (e.g ZF). However, the access node 20 needs to know what kind of report is sent from the communication devices in its cell to optimize the system in a multi terminal scenario. Hence, this information needs to be communicated, unless the access node 20 is otherwise aware of the state of the communication device 30. In a preferred embodiment, communication devices capable of performing interference reduction, by e.g. precoding, announce this as a UE capability. This announcement may be carried out at initial attach to the network 1, by communication with any access node of that network 1. In alternative embodiments, this capability may be announced by means of a flag, code or bit, included in or attached to a beam report, such as a beam report including quality metric for received beams without any applied interference reduction.

In various embodiments, a method is provided for operation in a communication device 30, for transmitting a beam report to an access node 20 of a wireless network 1. The method may comprise transmitting a capability indication to the wireless network to announce capability to perform interference reduction between received beams. The communication device may receive and detect a number of beams from the access node, such as a first beam 50 and a second beam 51 of an access node beam sweep. Logic 31 in the communication device 30 may be configured to determine first link quality metric for the received beams, such as signal strength. The logic 31 may further be configured to determine second link quality metric for the received beams 50, 51 based on applied interference reduction in the communication device 30. The communication device is further configured to transmit a beam report based on at least one of first and second link quality metric. In various embodiments, the communication device 30 is configured to always include link quality metric for the received beams, without applied interference reduction. In various embodiments, the communication device 30 is configured to always include link quality metric also with applied interference reduction.

In various embodiments, the communication device 30 may be configured to receive a request signal from the access node 20 to report interference reduction of received beams in the communication device 30. Typically, such a request signal may be transmitted from the access node responsive to detecting said capability indication, and a need or desire determined in the access node 20 for interference reduction. Such a desire or need may be based on an overall traffic situation in the cell served by the access node 20. Normally, a communication terminal 30 will benefit from selecting a strongest beam 50, 51 without any interference reduction, since such interference reduction may not only reduce interference from adjacent beams, but also attenuate the best beam. Where such a request signal is received in the communication device 30, the communication device 30 may be configured to include the second link quality metric in the beam report.

In various embodiments, the request signal from the access node 20 may indicate one access node beam to the communication device 30, so as to configure the communication device 30 to determine second link quality metric where interference reduction of other beams is applied to favor said indicated one beam. This may e.g. be beneficial when a communication device 30 has provided a beam report with a strongest, or best received, first beam 50, and a weaker but acceptable second beam 51. Based on an overall traffic situation, and a beam report from another communication device 40, the access node 20 may favor to allocate the beam 50 to that other communication device 40, at least based on a measure of possible attenuation of the beams received in the communication device 30 and the resulting second quality link measurement. The communication device 30 may further be allocated to the second beam 51, based on the measure of possible attenuation of the beams.

FIG. 7A schematically illustrates an exemplary beam report including candidate beams 50, 51, 52 as indicated in FIG. 6. An access node beam identity 72 is provided for each reported beam, e.g. 9 for beam 50; 3 for beam 51; and 1 for beam 52. The access node beam identity 72 may take the shape of a pilot signal, such as a channel sounding signal, e.g. CSI-RS, as detected in the received beam, or any other identity which the access node 20 may interpret as a certain beam. Link quality metric 73, as determined by the communication device 30 based on the received beams, is also provided, e.g. a signal strength or gain value associated with reception of the respective beam. The link quality metric 73 is associated with detection without applied interference reduction, e.g. the highest link quality metric for at least one beam 50 and the associated link quality metric detected for the other received beams 51, 52. In FIG. 7A, also second link quality metric 74 is provided, which is determined based on applied interference reduction, e.g. in accordance with any of the mentioned techniques, and preferably favoring the best received beam 9. FIG. 7B illustrates a variant of the embodiment of FIG. 7A, where the second link quality metric 75 is provided as a measure of possible attenuation of the beams 1, 3, 9 listed in the beam report, based on the first quality link metric.

Figure 8:
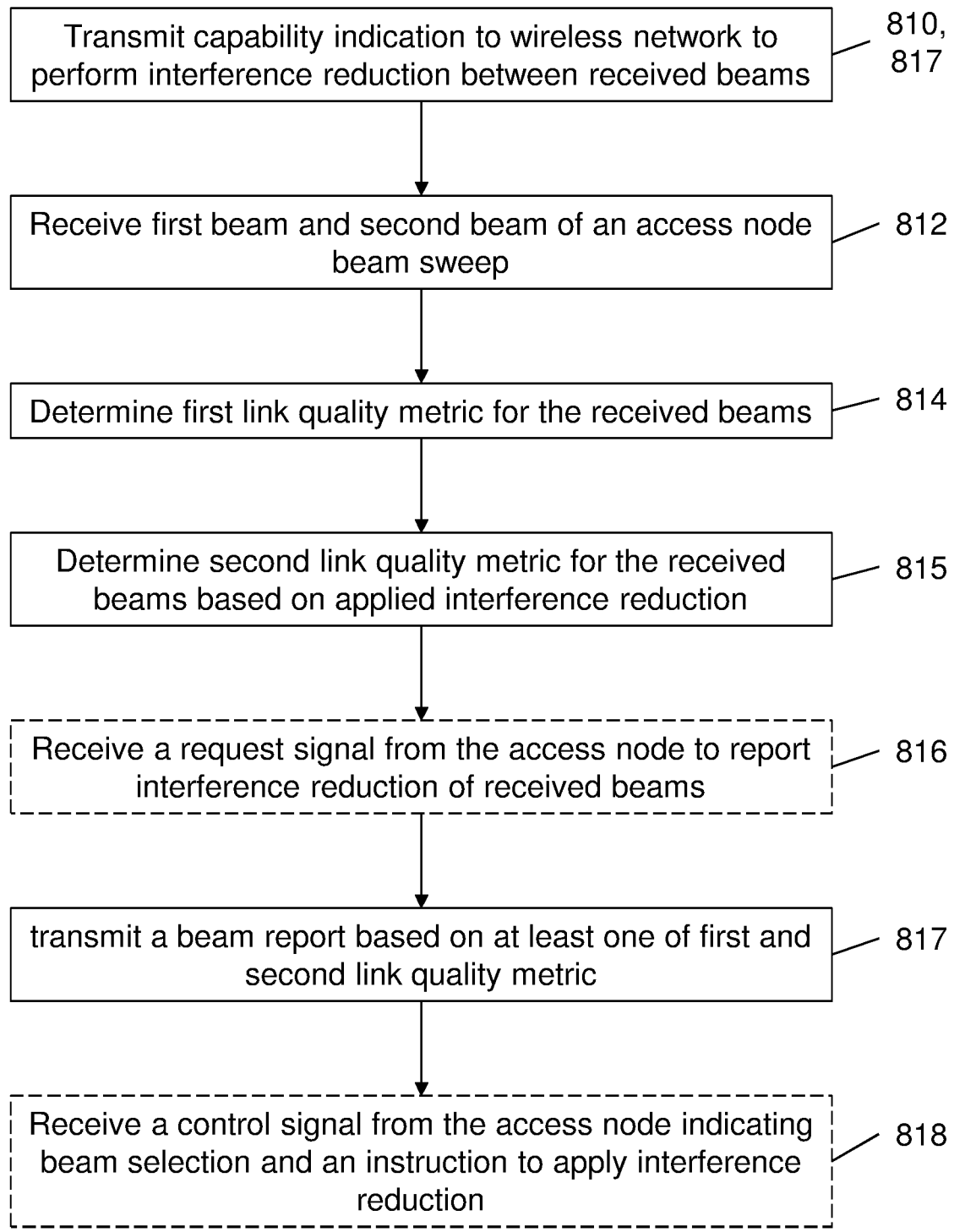
FIG. 8 schematically illustrates a flowchart including steps carried out in a communication terminal in accordance with various embodiments.
Figure 9:
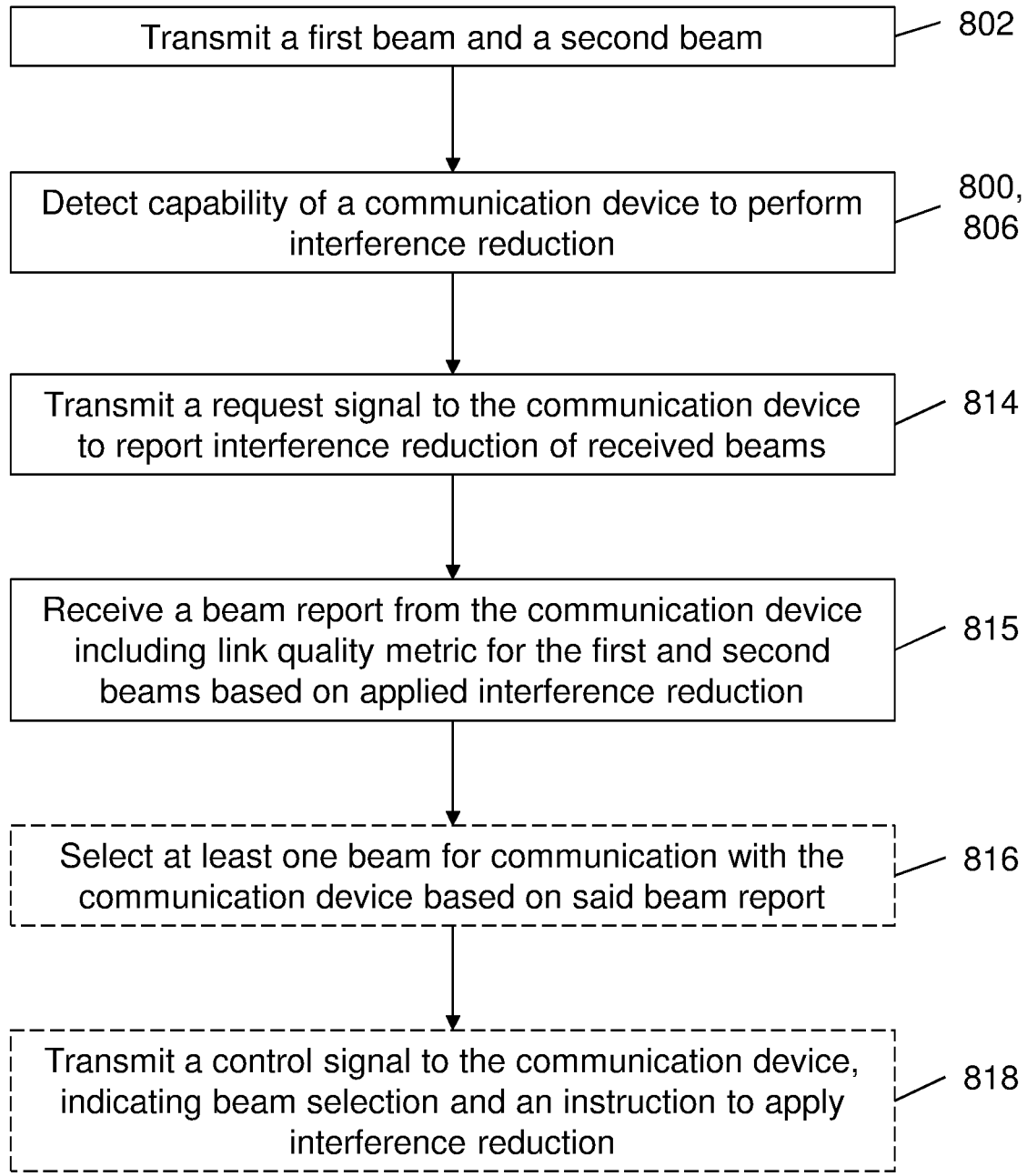
FIG. 9 schematically illustrates a flowchart including steps carried out in an access node in accordance with various embodiments.
Figure 10:
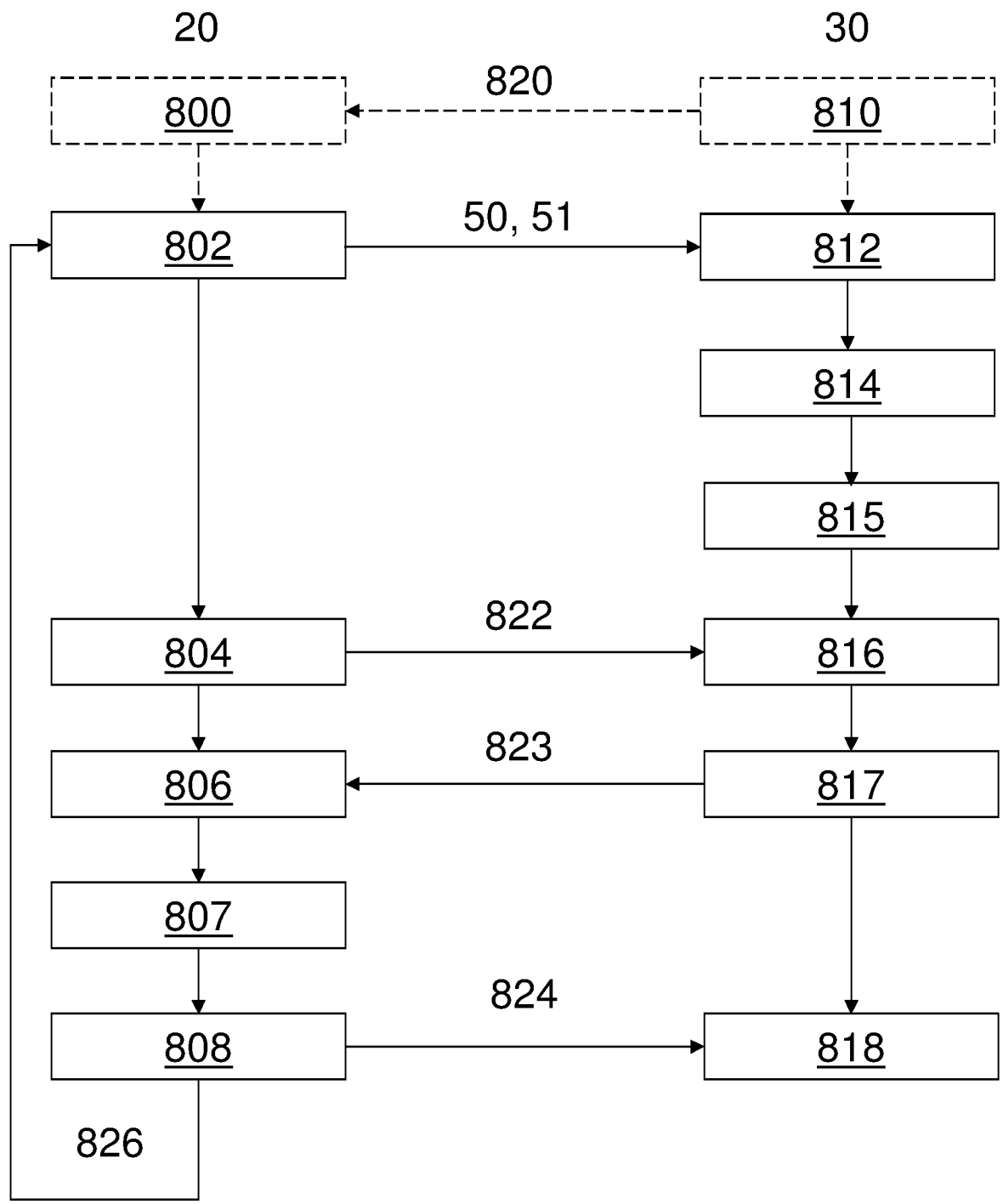
FIG. 10 schematically illustrates a flowchart including steps carried out in a wireless system including a communication device and an access node, in accordance with various embodiments.

FIGS. 8 to 10 illustrate method steps of embodiments outlined herein.

FIG. 8 discloses steps carried out in a communication device 30 configured to communicate with an access node 20 of a wireless network 1, comprising an antenna arrangement 32,33 configured for beamforming, for receiving radio signals transmitted in a plurality of beams from an access node 20, and for transmitting radio signals; and a logic 31 coupled to the antenna arrangement.

FIG. 9 discloses steps carried out in an access node 20 of a wireless network 1, comprising an antenna arrangement 22 configured for beamforming, for transmission of radio signals in a plurality of beams of a beam sweep, and for receiving radio signals from a communication device 30; and a logic 21 coupled to the antenna arrangement.

FIG. 10 illustrates the steps outlined in FIGS. 8 and 9 in a common flowchart, including steps carried out both by the communication device 30 and the access node 20, as well as signals transmitted between them. By step 826 in FIG. 10, it is indicated that beam reporting may be suitably repeated, whereas beam selection and allocation need not be carried out for every beam report.

With reference to FIGS. 8 and 10, various embodiments may relate to a method in a communication device 30 for transmitting a beam report 823 to an access node 20 of a wireless network 1. The method may comprise transmitting 810,817 a capability indication 820 to the wireless network to announce capability to perform interference reduction between received beams. This capability may be conveyed by UE capability signaling 810 at network attach, to any access node 20, 20' of the network 1. In an alternative embodiment, the capability indication may be conveyed as a separate signal or as part of a beam report 823 to the access node 20.

The method may comprise receiving 812 a plurality of beams 50-55 from a common access node 20, such as a first beam 50 and a second beam 51 of an access node beam sweep 802; and determining 814 first link quality metric for the received beams.

The method may comprise determining 815 second link quality metric for the received beams based on applied interference reduction in the communication device. The communication device may comprise an antenna array 32, 33 configured for beamforming, wherein the interference reduction e.g. may be carried out by means of changing code book entry for said antenna array, and/or tuning a beam angle for said antenna array, and/or by applying zero forcing. In various embodiments, the step of determining 815 second link quality metric for the received beams based on applied interference reduction need not be carried out by default in each beam report cycle 826, but rather in response to receiving an instruction or request 822 from the access node 20 to determine and/or report interference reduction.

The method may comprise transmitting 817 a beam report 823 based on at least one of first and second link quality metric. Normally, i.e. without detecting a request from the access node, or without detecting in the communication device 30 that a certain level of interference in reception of two or more access node beams 50, 51 is present, the beam report 823 will only contain the strongest received signals without attenuation, i.e. the first link quality metric.

The method may comprise receiving 816 a request signal 822 from the access node 20 to report interference reduction of received beams in the communication device 30, wherein the second link quality metric is included in the beam report 823 based on receiving said request signal. In an alternative embodiment, the communication device 30 may, by itself, determine that a certain level of interference in reception of two or more access node beams 50, 51 is present in step 816, and thereby include the second link quality metric in the beam report 823.

In one embodiment, the beam report 823 is formatted to convey even further information, with regard to possible interference reduction. This is schematically illustrated in FIG. 7C. The communication device may thus be configured to determine 815 a link quality metric 741 for the received beams 50, 51 based on interference reduction applied to favor reception of the first beam 50 over the second beam 51. Here, the first access node beam 50 may be associated with an access node beam identity 9, whereas the second access node beam 51 may be associated with an access node beam identity 3. The communication device may thus be configured to determine 815 a link quality metric 742 for the received beams 50, 51 based on interference reduction applied to favor reception of the second beam 51 over the first beam 50. The second link quality metric 74 would then include both these link quality metrics 741, 742, and include them in the transmitted 817 beam report 823. In this context, the link quality metrics 741 may be referred to as primary link quality metrics 741, as they relate to favoring the first access node beam 50. The link quality metrics 742 may be referred to as secondary link quality metrics 742, as they relate to favoring the second access node beam 50.

The method may be carried out in a communication device 30 comprising an antenna array 32, 33 configured for beamforming, wherein said capability indication 820 includes an indication of number of angular directions which the communication device is capable of resolving for beam reception. This is associated with the number of AoDs (Angle of Departure) or Angles of Arrival (AoA) that the communication device 30 is capable of resolving or suppressing in at least the DL, by use of the antenna arrangement 32, 33. This also relates to the number of angular directions in which the communication device is capable of suppressing beam reception.

The method may comprise receiving 818 a control signal 824 from the access node indicating a beam selection for communication, and an instruction to apply interference reduction in the communication device 30.

The method may comprise determining 815 a measure of possible attenuation of at least one of said first and second beam based on said applied interference reduction, wherein said beam report 823 indicates said measure.

With reference to FIGS. 9 and 10, various embodiments may relate to a method in an access node 20 of a wireless network 1, for transmission of radio signals in a plurality of beams of a beam sweep. The method may comprise transmitting 802 a plurality of beams in a beam sweep, including a first beam 50 and a second beam 51. The method may comprise detecting 800, 806 capability of a communication device 30 to perform interference reduction. This may be detected from UE capability signaling from the communication device to the network 1, and subsequently stored in the network 1. Alternatively, this capability may be detected from a beam report 823 received from the communication device 30.

The method may comprise transmitting 804 a request signal 822 to the communication device 30 to report interference reduction of received beams in the communication device 30. This request signal may be transmitted as an instruction to always report interference reduction as determined in the communication device 30, or to do so in every beam report within a certain time period; or for a subsequent beam report 823.

The method may comprise receiving 806 a beam report 823 from the communication device 30 including link quality metric for the first and second beams 50,51 based on applied interference reduction in the communication device 30.

The method may comprise selecting 807 at least one beam for communication with the communication device 30 based on at least said beam report; and transmitting 808 a control signal 824 to the communication device, indicating beam selection and an instruction to apply interference reduction in the communication device 30.

The proposed methods provide increased knowledge to the network 1, and specifically the access node 20, for handling communication devices in its cell. Specifically, this will be beneficial when traffic load is comparatively high, wherein allocation of beams to different communication devices may be decided based on a perceived interference situation in a communication device 30.

The invention claimed is:

1. A method in a communication device for transmitting a beam report to an access node of a wireless network, the method comprising
    transmitting a capability indication to the wireless network to announce capability to perform interference reduction between received beams;
    receiving a first beam and a second beam of an access node beam sweep;
    determining a link quality metric for the received beams with interference reduction applied to favor reception of the first beam over the second beam in the communication device;
    transmitting a beam report based on at least said link quality metric.

2. The method of claim 1, comprising:
    receiving a request signal from the access node to report interference reduction of received beams in the communication device, wherein the beam report is transmitted based on said link quality metric responsive to receiving said request signal.

3. The method of claim 1, wherein the communication device comprises an antenna array configured for beamforming, wherein said capability indication includes an indication of a number of angular directions which the communication device is capable of resolving for beam.

4. The method of claim 1, comprising:
    receiving a control signal from the access node indicating a beam selection for communication, and an instruction to apply interference reduction in the communication device.

5. The method of claim 1, comprising:
    determining a measure of possible attenuation of at least one of said first and second beam based on said applied interference reduction, wherein said beam report indicates said measure.

6. The method of claim 1, wherein the communication device comprises an antenna array configured for beamforming, wherein the interference reduction is carried out by means of changing code book entry for said antenna array.

7. The method of claim 1, wherein the communication device comprises an antenna array configured for beamforming, wherein the interference reduction is carried out by tuning a beam angle for said antenna array.

8. The method of claim 1, wherein the communication device comprises an antenna array configured for beamforming, wherein the interference reduction is carried out by applying zero forcing.

9. The method of claim 1, wherein said link quality metric related to favoring the first access node beam is primary link quality metric, the method further comprising:
    determining secondary link quality metric for the received beams based on interference reduction applied to favor reception of the second beam over the first beam in the communication device;
    wherein said beam report includes said primary and said secondary link quality metrics.

10. A method in an access node of a wireless network, for transmission of radio signals in a plurality of beams of a beam sweep, comprising:
    transmitting a first beam and a second beam;
    detecting capability of a communication device to perform interference reduction;
    transmitting a request signal to the communication device to report interference reduction of received beams in the communication device;
    receiving a beam report from the communication device including link quality metric for the first and second beams with applied interference reduction in the communication device.

11. The method of claim 10, comprising:
    selecting at least one beam for communication with the communication device based on at least said beam report;
    transmitting a control signal to the communication device, indicating beam selection and an instruction to apply interference reduction in the communication device.

12. A communication device configured to communicate with an access node of a wireless network, comprising:
    an antenna arrangement configured for beamforming, for receiving radio signals transmitted in a plurality of beams from an access node, and for transmitting radio signals; and
    a logic coupled to the antenna arrangement and configured to:
    transmit a capability indication to the wireless network to announce capability to perform interference reduction between received beams;
    receive a first beam and a second beam of an access node beam sweep;
    determine a link quality metric for the received beams with interference reduction applied to favor reception of the first beam over the second beam in the communication device;
    transmit a beam report based on at least said link quality metric.

13. The communication device of claim 12, wherein the logic is configured to:
    receive a request signal from the access node to report interference reduction of received beams in the communication device; and
    include the link quality metric in the beam report based on receiving said request signal.

14. The communication device of claim 12, wherein said capability indication includes an indication of a number of angular directions which the communication device is capable of resolving for beam reception.

15. The communication device of claim 12, wherein the logic is configured to:
    receive a control signal from the access node indicating a beam selection for communication; and
    apply interference reduction in the communication device based on information in said control signal.

16. The communication device of claim 12, wherein the logic is configured to:
    determine a measure of possible attenuation of at least one of said first and second beam based on said applied interference reduction, wherein said beam report indicates said measure.

17. The communication device of claim 12, further comprising:
    an antenna array configured for beamforming,
    wherein the logic is configured to carry out interference reduction by means of changing code book entry for said antenna array.

18. The communication device of claim 12, further comprising:
    an antenna array configured for beamforming, wherein the logic is configured to carry out interference reduction by tuning a beam angle for said antenna array.

19. The communication device of claim 12, further comprising:
an antenna array configured for beamforming,
wherein the logic is configured to carry out interference reduction by applying zero forcing.

20. The communication device of claim 12, wherein said link quality metric related to favoring the first access node beam is primary link quality metric, and wherein the logic is configured to:
determine secondary link quality metric for the received beams based on interference reduction applied to favor reception of the second beam over the first beam in the communication device;
wherein said beam report includes said primary and said secondary link quality metrics.

\* \* \* \* \*